US005838571A

United States Patent [19]

Lewis

[11] Patent Number: 5,838,571

[45] Date of Patent: Nov. 17, 1998

[54] TABLET PRESS MONITORING AND CONTROLLING METHOD AND APPARATUS

[75] Inventor: David A. Lewis, Fairfield, Calif.

[73] Assignee: ALZA Corporation, Palo Alto, Calif.

[21] Appl. No.: 593,769

[22] Filed: Jan. 29, 1996

[51] Int. Cl.[6] .............................. G06F 9/315; G06F 11/30

[52] U.S. Cl. .................. 364/476.01; 364/552; 264/40.1; 264/40.5; 425/149

[58] Field of Search .............................. 364/476.01, 552, 364/134, 468; 425/149, 78, 345, 353–354, 140; 264/40.1–40.5; 73/11, 94, 11.01, 770

[56] References Cited

U.S. PATENT DOCUMENTS

| | | | |
|---|---|---|---|
| 3,255,716 | 6/1966 | Knoechel et al. | 107/17 |
| 3,890,413 | 6/1975 | Peterson | 264/40 |
| 3,982,865 | 9/1976 | Adams et al. | 425/149 |
| 4,000,231 | 12/1976 | Peterson | 264/40.2 |
| 4,016,744 | 4/1977 | Williams et al. | 73/11 |
| 4,030,868 | 6/1977 | Williams | 425/149 |
| 4,062,914 | 12/1977 | Hinzpeter | 264/40.1 |
| 4,099,239 | 7/1978 | Williams | 264/40.4 |
| 4,100,598 | 7/1978 | Stiel et al. | 364/476 |
| 4,121,289 | 10/1978 | Stiel | 264/40.1 |
| 4,238,431 | 12/1980 | Stuben | 264/405 |
| 4,253,811 | 3/1981 | Hinzpeter et al. | 425/149 |
| 4,373,888 | 2/1983 | Yamamoto | 425/149 |
| 4,396,564 | 8/1983 | Stuben et al. | 264/405 |
| 4,452,579 | 6/1984 | Janson | 425/149 |

(List continued on next page.)

FOREIGN PATENT DOCUMENTS

| | | |
|---|---|---|
| 90600a | 10/1983 | European Pat. Off. . |
| 204266A | 12/1986 | European Pat. Off. . |
| 0 431 269 A1 | 9/1990 | European Pat. Off. . |
| 29 52 716 A1 | 12/1979 | Germany . |
| 2951716 | 12/1979 | Germany . |
| 37 15 077 A1 | 5/1987 | Germany . |
| 37 15 077 A1 | 12/1988 | Germany . |
| 8043476 | 11/1978 | Japan . |
| 59-087031A | 5/1984 | Japan . |
| 61-111800A | 5/1986 | Japan . |
| 62-137200A | 6/1987 | Japan . |
| 837901 | 6/1981 | U.S.S.R. . |
| WO8103076 | 10/1981 | WIPO . |
| WO8605743 | 10/1986 | WIPO . |
| WO 93/09939 | 5/1993 | WIPO . |

OTHER PUBLICATIONS

Remington's Pharmaceutical Sciences, 18th Ed., (1990), p. 1653 (Fig 89–29.

*Primary Examiner*—James P. Trammell
*Assistant Examiner*—Bryan Bui
*Attorney, Agent, or Firm*—D. Byron Miller; Steven F. Stone

[57] ABSTRACT

Compression forces (F) in a rotary tablet compressing machine (40) are monitored and controlled to provide enhanced accuracy in determining peak compression value and continuous validation of a compression waveform. The compression waveform is repetitively sampled under computer control at a sampling frequency that is many times the frequency of the compression events. The samples are stored in a computer memory (26) until at least one complete compression event is recorded. Identification of beginning and ending samples of an individual tablet compression event are obtained from the waveform itself by locating minimum amplitude samples, or by use of a separate signal that is derived from a transducer which is responsive to the angular position of a rotating turret. Stored samples representing the compression waveform as time and amplitude data are passed to a processor (23) that statistically fits the data to an equation form which represents the ideal shape of a compression event. If the quality of the data fit falls below a preset value, the tablet associated with that coefficient is subsequently rejected by a mechanism that is activated by the computer (26), which records the event as a waveform error. A counter (25), having a user selectable maximum threshold, is incremented each time a tablet is rejected from the same punch pair as a result of a waveform error. If the maximum count threshold is reached, then the tablet compressing machine (40) is stopped by the computer (26) and a message identifying the faulty punch pair is displayed.

24 Claims, 6 Drawing Sheets

U.S. PATENT DOCUMENTS

| | | | |
|---|---|---|---|
| 4,570,229 | 2/1986 | Breen et al. | 364/476.01 |
| 4,680,158 | 7/1987 | Hinzpeter et al. | 264/405 |
| 4,770,621 | 9/1988 | Groebli | 425/150 |
| 4,815,001 | 3/1989 | Uthe et al. | 364/552 |
| 4,817,006 | 3/1989 | Lewis | 364/476 |
| 5,004,576 | 4/1991 | Hinzpeter et al. | 264/405 |
| 5,119,311 | 6/1992 | Gold et al. | 364/476 |
| 5,145,693 | 9/1992 | Hinzpeter et al. | 425/149 |
| 5,202,067 | 4/1993 | Solazzi et al. | 264/40.5 |
| 5,211,964 | 5/1993 | Prytherch et al. | 425/140 |
| 5,223,192 | 6/1993 | Hinzpeter et al. | 264/40.5 |
| 5,229,044 | 7/1993 | Shimada et al. | 264/40.5 |
| 5,288,440 | 2/1994 | Katagiri et al. | 264/40.5 |
| 5,322,655 | 6/1994 | Ebey | 264/40.5 |

TABLET PRESS MONITORING AND CONTROLLING METHOD AND APPARATUS

TECHNICAL FIELD

The invention relates to the production of tablets in a rotary tablet compressing machine. More particularly, the invention relates to monitoring and controlling compression forces in a rotary tablet compressing machine.

BACKGROUND ART

The making of medicinal tablets by compression of powders, dry or treated, is an old art and satisfactory machinery for making such tablets has long been available. At this time, rotary presses are commonly in use, in which powders or other materials that can be formed into tablets are placed into one of a plurality of generally cylindrical dies that are mounted within a rotary die holding turret. A pair of opposed cam operated punches compress the powder from both ends of each tablet forming die, and thereby compact the powder into an individual tablet. The rotary turret arrangement allows a plurality of punch and die sets to produce tablets continuously around the circular path followed by the rotary press by sequentially contacting an arrangement of cams above and below the turret that lift and lower the punches. In modern tablet press machines, pharmaceutical tablets are produced at rates as high as 12,000 tablets per minute. See, for example Knoechel et al, U.S. Pat. No. 3,255,716.

It is highly desirable that all tablets prepared by rotary tablet press mechanisms be of uniform and precisely controlled size and weight. This is especially true for medicinal tablets because carefully prescribed dosage amounts are difficult to achieve without accurate tablet size and weight control. Inaccuracies in tablet size and weight stem from a variety of different circumstances, but most commonly result from the uneven introduction of the powders into the die and punch combination. Inaccuracies can also result from imperfections or wear in the tablet press or die elements, or from changes in the density or moisture content of the powder being compressed.

It is known in the art to evaluate the weight of compressed tablets and thereby determine if such tablets are defective. Generally, individual tablets are monitored by evaluating the compression between the punches during tablet formation. Overweight tablets, resulting from excessive powder or granular material placed between the opposing punches, produce higher than normal compacting forces. Similarly, underweight tablets, resulting from a smaller than normal quantity of powder or granular material between the opposing punches, produce less than normal compressive forces between the opposing punches.

Tablet press mechanisms also typically include a structure for removing the formed tablet from the punches and dies. Normally, rotary tablet press mechanisms include a second cam system that causes the lower punches to lift the formed tablet to the surface of the rotating turret after compression. A blade or the like is disposed slightly above the rotating turret at a location that intersects the path of the dies. The blade then scrapes the tablets from the turret to a discharge chute. Often, such blade mechanisms are combined with a reject gate. Defective tablets are detected through analysis of the punch forces, and a pneumatic air jet is timed to deflect defective tablets away from the blade into a reject chute.

The measurement of compression forces for tablet weight monitoring and control in rotary tablet press mechanisms is thought to have originated with Knoechel et al, ibid. Since that time, many tablet press manufacturers have developed monitoring and control systems based upon the measurement of the peak compression force obtained from each tablet compression event. See, for example Williams, U.S. Pat. No. 4,099,239 (selectively applying tablet formation information to a converting means to render the selected information in a convenient form for processing); Stiel, et al U.S. Pat. No. 4,100,598 (instrumenting a tablet press to derive peak compression force and peak ejection force in digital form); Stiel, U.S. Pat. No. 4,121,289 (using a transducer to effect a signal output indicative of the compression force developed for each tabletting event); Williams, U.S. Pat. No. 4,030,868 (selectively applying tablet formation information to a converting means to render the selected information in a convenient form for processing); Breen, et al U.S. Pat. No. 4,570,229 (a data word having a magnitude indicative of a compression signal is processed in a preestablished manner to detect if the value of the data word exceeds or fails to exceed preestablished limits); and Hinzpeter, U.S. Pat. No. 4,062,914 (a mean value generator produces a mean pressing force value while a logic control unit causes preset individual limit values for the pressing force signals to track fluctuation in the mean value, where the instantaneous pressing force signals are compared with the individual limit values to control machine operation).

Such known systems typically use one of the two following methods for measurement of the peak compression force:

A peak detector circuit that stores the maximum electrical signal from a force transducer. In this circuit, the peak is digitized by an analog-to-digital converter and the peak detector circuit is subsequently reset by a signal that is synchronized to the tablet press rotation. See, for example Lewis, U.S. Pat. No. 4,817,006.

A circuit that triggers an analog-to-digital converter at a time which is coincident with the maximum pressing force. A trigger signal is derived from a rotary encoder that supplies pulse in synchronism with the rotation of the tablet press. See, for example Hinzpeter, et al U.S. Pat. No. 5,145,693, and Hinzpeter, el al U.S. Pat. No. 5,223,192.

Both of the above methods are highly susceptible to inaccuracies that are caused by electrical noise and interference, and by mechanical defects that are frequently present in actual tablet pressing environments. These inaccuracies become far more significant at the low compression forces that are normally used for the compression of a first layer in a bilayer tablet (for a discussion of the manufacture of bilayer tablets, see Ebey, U.S. Pat. No. 5,322,655).

The compression of a tablet can be graphically illustrated as a roughly bell-shaped plot of compression force versus time. See for example, Remington's Pharmaceutical Sciences, 18th Edition, (1990), p 1653 (FIG. 89-29). Because electrical interference is stored as part of the peak value by both of the above methods, both methods are easily corrupted in an actual tablet pressing environment. Both of these methods are incapable of distinguishing between a bonafide compression waveform and electrical interference because they are responsive to the input signal at only one instant in time. Similarly, both methods are incapable of detecting mechanical defects, such as the punch striking the side of the die upon entry, or defects in the punch heads and/or compression rolls, since these defects typically do not cause peak compression forces or because the defects (eg, the punch striking the opening of the die) do not occur at the same time as the peak compression force.

The method disclosed in U.S. Pat. Nos. 5,145,693 and 5,223,192 requires precise timing of the trigger signal if reasonable accuracy is to be obtained. Manufacturing tolerances of various parts of the tablet press and coupling to the rotary encoder can cause displacement of the trigger signal with respect to the peak amplitude of the pressing force. Such misregistration leads to further errors. Both methods allow the signals representing machine rotation to be incorrectly timed with respect to the compression signal, thereby causing gross errors. It would therefore be advantageous to provide a method of monitoring pressing forces which overcomes the limitations of the prior art.

DISCLOSURE OF THE INVENTION

The invention provides a method and apparatus for more accurately monitoring compression forces in a rotary tablet compressing machine and controlling the operation of the machine based upon the monitored compression forces. The invention provides a system that distinguishes between genuine compression signals and electrical noise, and that has the ability to detect mechanical defects of the tablet press or punches, such as:

upper punch striking the die upon entry;

pressure overload in tablet presses equipped with an overload release mechanism;

imperfections in punch heads, compression rolls, and roll bearings; and sticking punches.

The invention also provides enhanced accuracy in determining peak compression value and continuous validation of the compression waveform. Because validation of the compression data obtained from a tablet press that is used to produce pharmaceutical tablets is of extreme importance when the data are used to control the weight of the tablet, and hence the quantity of the drug contained therein, such continuous validation of the compression data includes verification of the correct phase and shape of the compression curve.

The present invention concerns a method and apparatus for monitoring a compression event in a tablet compressing. The method includes sampling at least a portion of a compression event waveform, statistically fitting said sampled waveform to an ideal compression event waveform, and altering the operation of either: (i) the tablet compressing machine; (ii) a machine associated with the operation of the tablet compressing machine; or both (i) and (ii); based upon the quality of the fit between the sampled waveform and the ideal waveform. The apparatus of the present invention includes at least one data collection channel for sampling at least a portion of a compression event waveform, a processor for statistically fitting said sampled waveform to an equation representing an ideal compression event waveform, and means for altering the operation of either: (i) the tablet compressing machine; (ii) a machine associated with the operation of said tablet compressing machine; or both (i) and (ii); based upon quality of the fit between the sampled waveform and the ideal waveform.

In the preferred embodiment of the invention, the compression waveform is repetitively sampled (ie, the compression force and the time of the force measurement are measured) under computer control at a sampling frequency that is many times the frequency of the compression events, such that each compression event, or any portion thereof, is sampled at least 5 times, preferably at least 50 times, and most preferably at least 100 times. The sampling frequency may be adjusted by the computer in proportion to the tablet press speed, such that the number of samples taken for each compression event is substantially equal. The samples are stored in a computer memory until at least one substantially complete compression event waveform is recorded. Identification of the beginning and ending of the tablet compression event may be obtained from the waveform itself by locating the minimum recorded compression forces, or by use of a separate signal that is derived from a transducer responsive to the angular position of the rotating press turret.

The stored data samples, representing the compression waveform as time and compression force amplitude data, are passed to a processor that statistically fits the data to an equation form which represents the ideal compression waveform shape of the compression event being monitored. If the quality of the data fit falls below a preset value, the compression event is considered to be defective (ie, a waveform error) and the operation of (i) the tablet compressing machine itself, or (ii) equipment associated with the operation of the tablet compressing machine, is altered. The alteration of machine operation may take any of several forms, but most commonly will be one or more of the following three forms;

(1) the tablet associated with that compression event is subsequently rejected;

(2) a counter, having a user selectable maximum threshold, is incremented each time a tablet is rejected from the same punch pair as a result of a waveform error and if the maximum count threshold is reached within some predetermined interval (eg, 3 tablet rejections within 5 operations of the punch pair), then a message identifying the faulty punch pair is displayed on an operator interface, and optionally the compressing machine is stopped; and/or (3) the sampled compression data is deemed to be statistically unreliable and is not used to control or adjust, via a conventional feedback control loop, the amount of fill introduced into the dies of the tablet compressing machine by a filling mechanism for subsequent tablet compressions.

The term "compression event" used herein refers to a single displacement cycle of a punch, or a pair of puches, relative to the respective die associated with that punch or pair of punches, during the compression of a tablet in a tablet compressing machine. In general, the compression event begins at a minimum compression force, leading to a maximum compression force, and ending with another minimum compression force. conventional homogenous or single layer tablets are subjected to only a single complete compression event. Multilayer tablets, on the other hand, are subjected to a plurality of complete compression events, the number of compression events generally corresponding to the number of discreet layers in the final tablet.

The term "mutilayer tablet" refers to tablets which are compressed using a plurality of complete compression events (ie, tablets having two or more layers produced by two or more successive and complete compression steps). The different layers of a multilayer tablet are formed using non-uniform compression forces. All layers except the last-formed layer in a multilayer tablet are compressed at much lower compression forces, referred to in the art as "tamping" forces, compared to the compression forces used to form the final tablet layer.

The device and method of the present invention have particular utility in controlling tablet presses which operate at lower compression forces. Lower compression forces are most typically used in compression events associated with the formation of all but the final layer of multilayer tablets. The initial layer(s) of multilayer tablets are typically compressed at tamping forces of less than about 1.3 kilo- Newtons (kN) (300 lbs). With low tamping compression forces, greater sensitivity to the measurement of the compression waveform shape is needed since variations in the compression waveform shape, which might not significantly affect tablets (or layer(s) of multilayer tablets) made using high compression forces, will have a proportionately greater effect on the quality of multilayer tablets made at low tamping compression forces.

MODES FOR CARRYING OUT THE INVENTION

The invention provides a method and apparatus for monitoring and controlling compression forces in a tablet compressing machine, such as a rotary tablet compressing machine. The invention distinguishes between genuine compression signals and electrical noise, and has the ability to detect mechanical defects of the tablet press or punches, such as:

- mechanical interference between the punch and the die, or between the punch and the punch guide, such as upper punch striking the die upon entry;
- pressure overload in tablet presses equipped with an overload release mechanism;
- imperfections in punch heads, compression rolls, and roll bearings; and
- sticking punches.

The invention also provides enhanced accuracy in determining peak compression value and continuous validation of the compression waveform, where such continuous validation of the compression data includes verification of the correct phase and shape of the compression curve.

Figure 1:
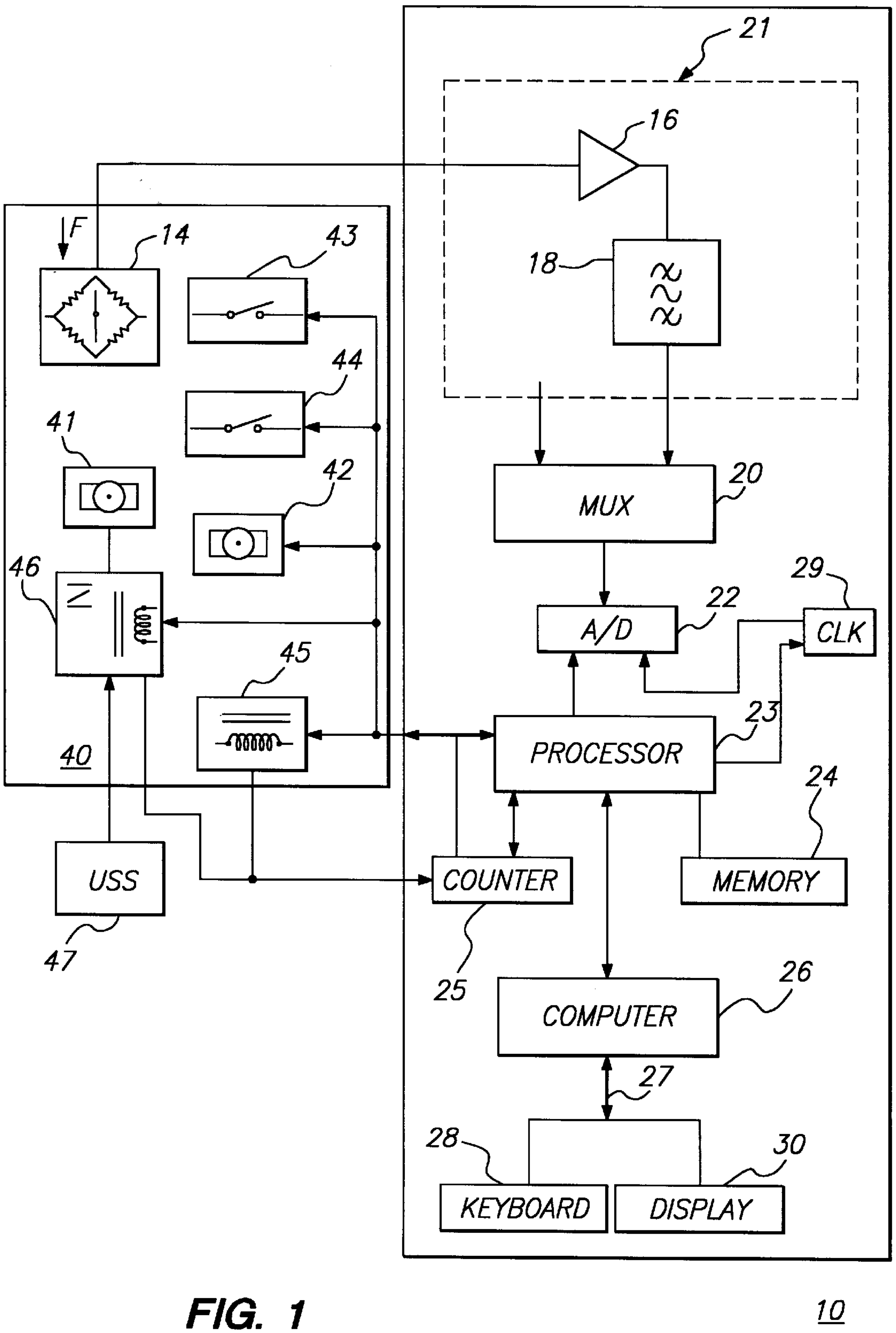
FIG. 1 is a block schematic diagram of a system for monitoring and controlling compression forces in a rotary tablet compressing machine according to the invention.

FIG. 1 is a block schematic diagram of a system 10 for monitoring and controlling compression forces in a rotary tablet compressing machine 40 according to the invention. The compressing machine 40 includes at least one data collection channel 21 that consists of a strain gauge comprised of a Wheatstone bridge circuit 14 to convert the compression force F, applied to the punches in the compressing machine, into proportional voltage signals V. These signals are coupled to an amplifier 16 that increases the signal to a level that is suitable for digitizing. The amplified signal is then coupled to an anti-aliasing filter 18 which limits the force sensing bandwidth to a maximum of one-half of the digitizing frequency in accordance with the Nyquist limit. In the preferred embodiment of the invention, the cut off frequency of the anti-aliasing filter is adjustable, for example by use of a software module or by use of mechanical means, each of which is well known in the art.

While the exemplary embodiment of the invention shows a strain gauge, the invention may also be practiced with such alternative force transducers as piezo crystals and displacement transducers. For example, the invention may be applied to tablet presses that provide a substantially constant force to a complement of pressure rolls by means of a spring or fluid/air pressure. In such presses, the pressure rolls move apart when material is compressed, whereas in constant thickness machines these rollers are fixed. In such case, a displacement transducer may be substituted for the strain gauge. This transducer may output a digitized signal (ie, a linear encoder), thereby eliminating the analog front end portion of the system described above.

The filtered signal is coupled to a multiplexer circuit 20 that is capable of selecting more than one force measurement channel 21, where each channel includes a strain gauge comprised of a Wheatstone bridge, an amplifier, and an anti-aliasing filter. The multiplexer is an optional feature of the invention. In those embodiments of the invention that include a multiplexer, it is expected that the multiplexer is controlled by the system software. The presently preferred data collection channel has been described above. However, it is anticipated that the invention can be readily used with other data collection devices, such as are known or will become known in the art.

The output of the multiplexer is coupled to an analog-to-digital (A/D) converter 22 that continuously digitizes the selected inputs of the multiplexer. A clock (CLK) 29 is used to trigger the A/D converter 22 at a clock frequency that may be controlled by the system software. A processor 23, which in the preferred embodiment of the invention is a digital signal processor having a sufficient memory 24 to implement the system software, provides system control and data processing of the digitized output signal.

A general purpose computer 26 is coupled to the processor 23 and provides an input/output (I/O) interface 27 that allows operator command entry, for example through a keyboard 28, as well a display of system status information, for example through a display 30.

In the compressing machine 40, a stepper motor 42 is controlled by the output signal from processor 23. The stepper motor 42 controls the tablet press metering ramp (not shown in FIG. 1) which controls the amount of powder fed into the dies. Thus the processor 23, via the stepper motor 42 and the metering ramp, can adjust the quantity of material placed in the compressing machine dies. A tablet reject device 45 is also controlled by the processor 23, and is used to separate defective tablets into a reject container (not shown). A counter 25, having a user selectable maximum threshold, is incremented each time a tablet is consecutively rejected from the same punch pair. If the maximum count threshold is reached within some predetermined number of consecutive compressions, then the operator is notified of the defective punch pair by means of a message on the display 30 which is generated by the computer 26. In addition, the tablet press motor 41 may be stopped by an electrical relay 46 that interrupts the supply of electrical power from power supply 47 to the motor 41 in response to a control signal from the processor 23. Thus, the tablet compressing machine is stopped and the defective punch pair is identified to the operator, enabling repairs to be efficiently made without the need for extensive trouble shooting.

The compressing machine 40 also includes a first proximity sensor 43 that provides an electrical impulse signal to the processor 23 at the passage of each punch barrel as the turret of the tablet press rotates. An optional second proximity sensor 44 provides an electrical impulse to the processor 23 at the passage of a single object located on the circumference of the turret. This signal occurs only once during each revolution of the tablet press turret. In alternative embodiments of the invention, the proximity sensors may be replaced with such devices as rotary encoders, where the angular position of the turret is sensed, or with other sensors for use with linear systems.

In some applications of the invention, it may be undesirable to check for compression waveform defects at lower force levels. For example, this may be necessary to allow a tablet press to continue production with worn punch guides that may cause high forces as the punch enters the die. To accommodate this feature, the system may allow the operator to provide any of a plurality of user selectable offsets and sample lengths (number of samples) to be applied prior to fitting the data to the function, for example via the keyboard 28, such that waveform distortions (ie, sections along the actual waveform that poorly fit the ideal waveform shape) are “ignored” by the system with the result that these waveform distorttions do not result in an alteration (eg, tablet rejection, operator signalled about defective punch pair, etc) of the operation of the tablet compressing machine. Alternatively, other fitting functions may be provided to accommodate the waveform generated by such worn compressing machine parts.

Figure 2:
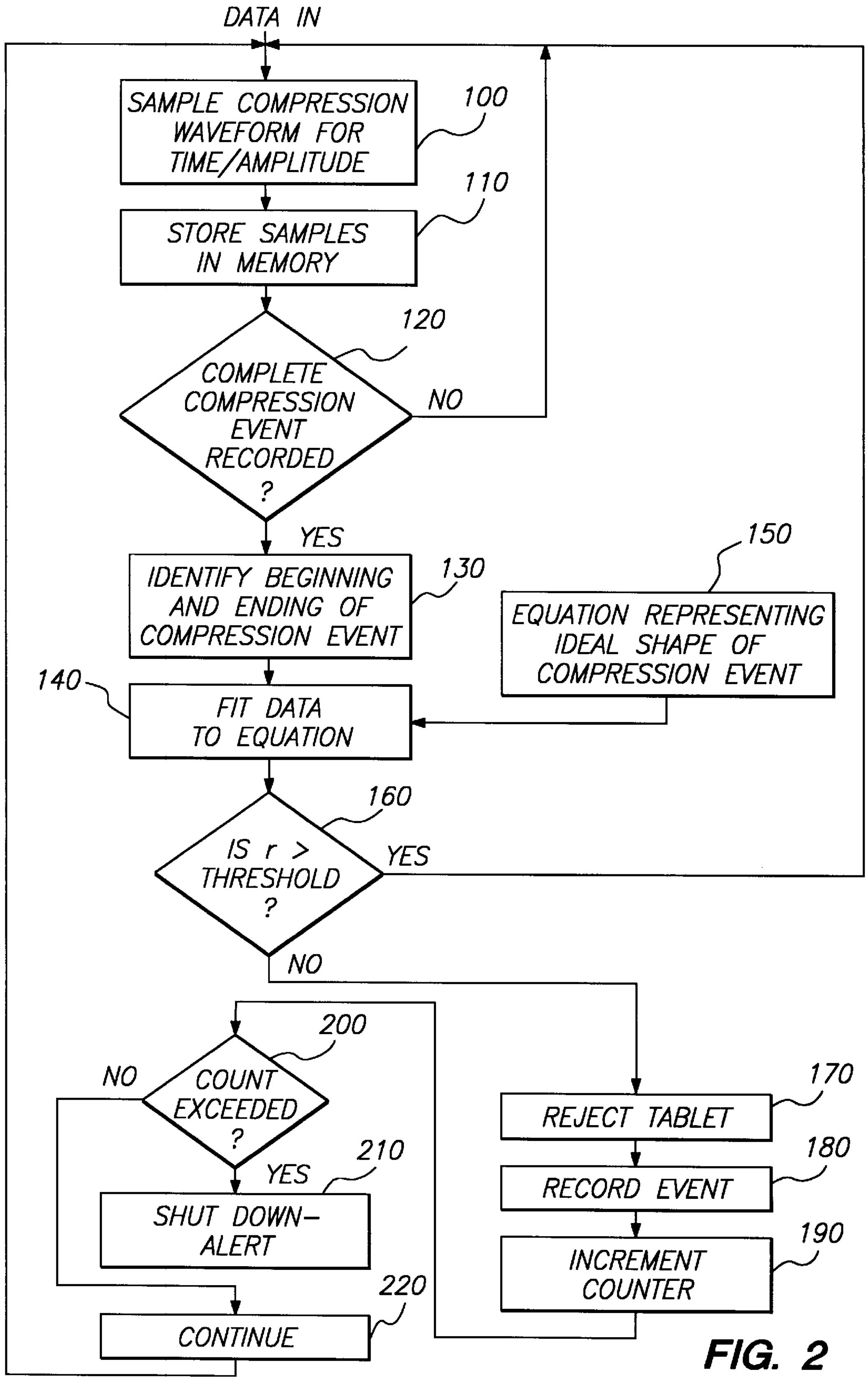
FIG. 2 is a flow diagram showing operation of the system for monitoring and controlling compression forces in a rotary tablet compressing machine according to the invention.

FIG. 2 is a flow diagram showing operation of the system for monitoring and controlling compression forces in a rotary tablet compressing machine according to the invention. In the preferred embodiment of the invention, the compression waveform is repetitively sampled under computer control at a sampling frequency that is many times the frequency of the compression events. The number of samples taken along the length of each compression event should be sufficient to result in a true and relatively accurate curve of compression force versus time. In general, the number of samples taken should be at least about 5 since fewer samples will at best produce only an approximation of the actual compression waveform shape. Preferably, the number of samples taken during a compression event is at least 50, and most preferably at least 100. The sampling frequency may be adjusted by the computer in proportion to the tablet press speed, such that the number of samples taken for each compression event is substantially equal.

The samples are stored (110) in a computer memory until at least one complete compression event is recorded (120). Identification of beginning and ending samples (130) of an individual tablet compression event are obtained from the waveform itself by locating minimum amplitude samples, or by use of a separate signal that is derived from a transducer responsive to the angular position of a rotating turret.

Stored samples representing the compression waveform as time and compression force amplitude data are passed to a processor that statistically fits the data (140) to an equation form (150) which represents the ideal waveform shape of the compression event.

Substantially any equation or other mathematical means which is effective to statistically compare the sampled waveform to the ideal waveform can be used to do the statistical fitting step. In general, the statistical fitting uses a mathematical equation which can be processed by the processor at sufficient speed to allow multiple samples of the time and compression force data to be taken and analyzed during the compression event in order to control subsequent operation of the tablet press or equipment associated with the operation of the tablet press, such as a tablet reject mechanism. For conventional rotary tablet presses, the preferred equation form is the lowest order polynomial that is capable of providing a good fit for a given tablet press geometry and the characteristics of the material being compressed. It should be appreciated that it is not necessary to fit the entire compression event waveform to the desired function. However, in addition to the area of the waveform peak, a substantial number of data samples on the ascending and descending portions of the waveform should be used to preserve the accuracy of the peak amplitude and position computation. Furthermore, other curve fitting techniques may be used in practicing the invention, eg, cubic spline fitting; and equations of non-polynomial form may be used, for example where a function is applied to the data prior to fitting.

For a tablet press having circular compression rolls and flat headed punches, the compression curve can usually be defined by a third order polynomial:

$$y=a+b_1x+b_2x^2+b_3x^3 \quad (1)$$

where y=force amplitude; and
where x=time or turret rotation angle.

The third order polynomial form allow for the normally different rates of force application and force decline at the leading and trailing portions of the waveform. An important aspect of this invention is that the order of the polynomial should be chosen to provide a good fit only for that data which represents an ideal compression curve, such that a statistical evaluation of the residuals can be used at a later stage to identify a non-ideal compression event, for example as is caused by interference or mechanical faults. Such residuals may be analyzed by any technique that quantifies the magnitude of the residuals, for example a summation of the unsigned values of the residuals.

The preferred technique for fitting the data to the polynomial form is the method of least squares which fits a regression line to the data. This method calculates polynomial coefficients that minimize the mean square error for the entire waveform data set. Implementation of this method in software for a third order polynomial involves solving the following system of normal equations:

$$\Sigma y=na+b_1(\Sigma x)+b_2(\Sigma x^2)+b_3(\Sigma x^3) \quad (2)$$

$$\Sigma xy=a(x)+b_1(\Sigma x^2)+b_2(\Sigma x^3)+b_3(\Sigma x^4) \quad (3)$$

$$\Sigma x^2y=a(x^2)+b_1(\Sigma x^3)+b_2(\Sigma x^4)+b_3(\Sigma x^5) \quad (4)$$

$$\Sigma x^3y=a(x^3)+b_1(\Sigma x^4)+b_2(\Sigma x^5)+b_3(\Sigma x^6) \quad (5)$$

These equations can be readily solved by a variety of well known computer algorithms, such as lower/upper (LU) decomposition or Gaussian elimination.

In addition to calculating the polynomial coefficients, the system calculates how closely the data fit the ideal waveform function by calculating the coefficient of determination, which is denoted as $r^2$. The system may also calculate a coefficient of correlation to determine the independence of the data and the ideal waveform, or how closely they fit. In the preferred embodiment of the invention, the coefficients of determination and correlation can be substituted by any statistical measure of residuals, which are defined as:

$$f(x_i)-y_i \tag{6}$$

where f is the fitting function; and
where $y_i$ is an array of waveform data points.

The square root of the coefficient of determination is called the coefficient of correlation, which is calculated from the formula:

$$r=n(\Sigma xy)-(\Sigma x)(\Sigma y)/[(n(\Sigma x^2)-(\Sigma x)^2)^{1/2}\cdot(n(\Sigma y^2)-(\Sigma y)^2)^{1/2}] \tag{7}$$

If the coefficient of determination falls below a preset value (160), the tablet associated with that coefficient is subsequently rejected (170) by a mechanism that is activated by the computer 26 (FIG. 1), which records the event (180) as a waveform error. In such case, the maximum force is deemed to be statistically unreliable and, if desired, is not used as data for the tablet weight control loop portion of the tabletting control system. The counter 25 (FIG. 1), having a user selectable maximum threshold, is incremented (190) each time a tablet is consecutively rejected from the same punch pair as a result of a waveform error. If the maximum count threshold is reached (200), then the tablet press is stopped (210) by the computer 26 and a message identifying the faulty punch pair is displayed on an operator interface 30. Otherwise, machine operation continues uninterrupted (220).

Heretofore, the apparatus and method of the present invention have been described in uses wherein either a compressed tablet is accepted or rejected or an operator is signalled concerning a defect in a punch and die combination. However, the method and apparatus of the present invention may also be used to adjust subsequent filling operations. In automated rotary tablet presses, the amount of solid particulate material fed into a die before compression may be adjusted based upon one or a plurality of previous compression events via a feedback control loop. Feedback control of tablet press die filling is well known in the prior art. See for example, Knoechel et al, U.S. Pat. No. 3,255,716. Similar feedback control loops may be used with the present invention in order to adjust the amount of solid particulate material fed to the dies in subsequent compression events. In using the apparatus and method of the present invention in order to adjust die filling, the recorded force amplitude data from the compression event is stored, and used to adjust subsequent filling of dies, only if the quality of the data fit of the sampled waveform to the ideal waveform is above some predetermined level. Thus, if the sampled waveform has a poor fit to the ideal waveform, the sampled waveform data is not used to adjust subsequent filling of dies via the feedback control loop.

Figure 3:
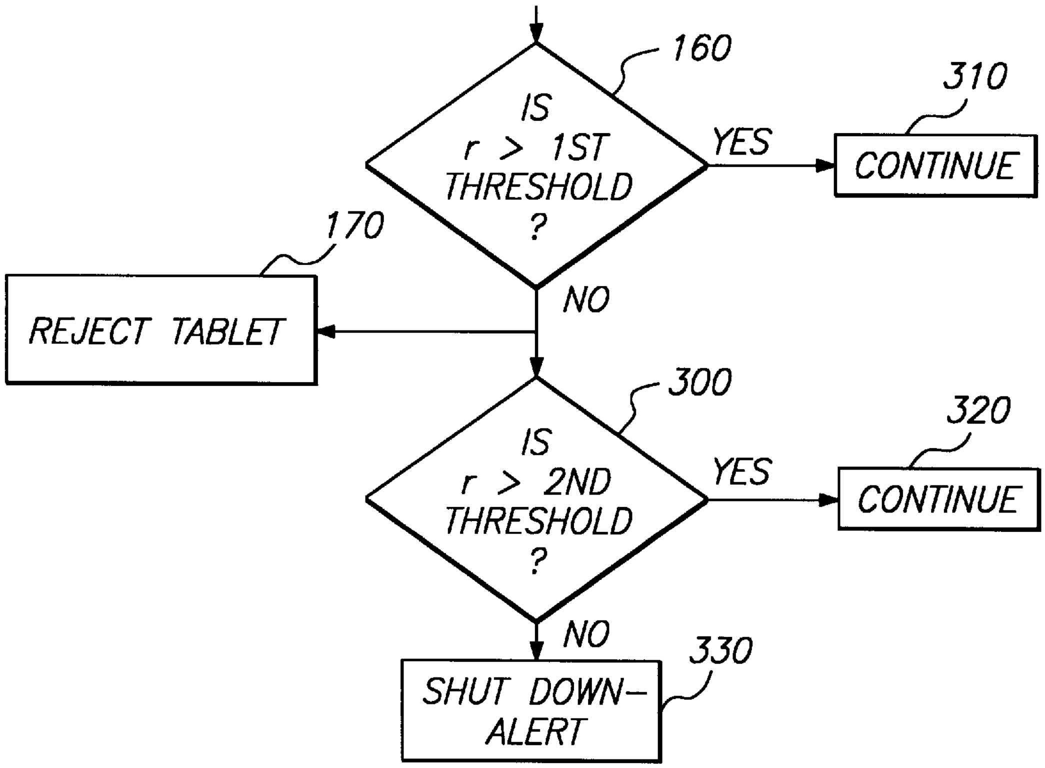
FIG. 3 is a partial flow diagram showing operation of the system for monitoring and controlling compression forces in a rotary tablet compressing machine according to an alternative embodiment of the invention.

FIG. 3 is a partial flow diagram showing operation of the system for monitoring and controlling compression forces in a rotary tablet compressing machine according to an alternative embodiment of the invention that provides a second, preset minimum threshold (300) for the coefficient of determination, where such second threshold is set to a lower value than the first threshold (160). The lower threshold represents a waveform error associated with the tablet manufacturing mechanism, such as an error that is consistent with a partially broken punch or serious deformation of the punch heads and pressure rolls. If the coefficient of determination falls below this lower threshold, the system stops the tablet press immediately (330). This action prevents further damage to the tablet press and/or tooling. Otherwise, system operation continues uninterrupted (310; 320)

One advantage of a functional representation of the compression waveform data is that elementary calculus may be used to determine such characteristics as rate of change (first derivative), points of inflection (second derivative), and area under the compression curve (integral). To achieve maximum accuracy for the measurement of peak amplitude, the fitted function of the compression waveform is differentiated with respect to turret rotation (time), and the resulting equation is solved. The root of this differentiated equation that yields a positive result for the function is therefore the turret angular position (or time) at which the pressing force is at a maximum. The peak compression forces is calculated by obtaining the value of the waveform function at this position.

The preferred method of finding the root of the first derivative in the case of a third order waveform function is a processor module that applies the quadratic formula:

$$x=(-b\pm(b^2-4ac)^{1/2})/2a \tag{8}$$

where the form of the second order function is $ax^2+bx+c$.

Figure 4:
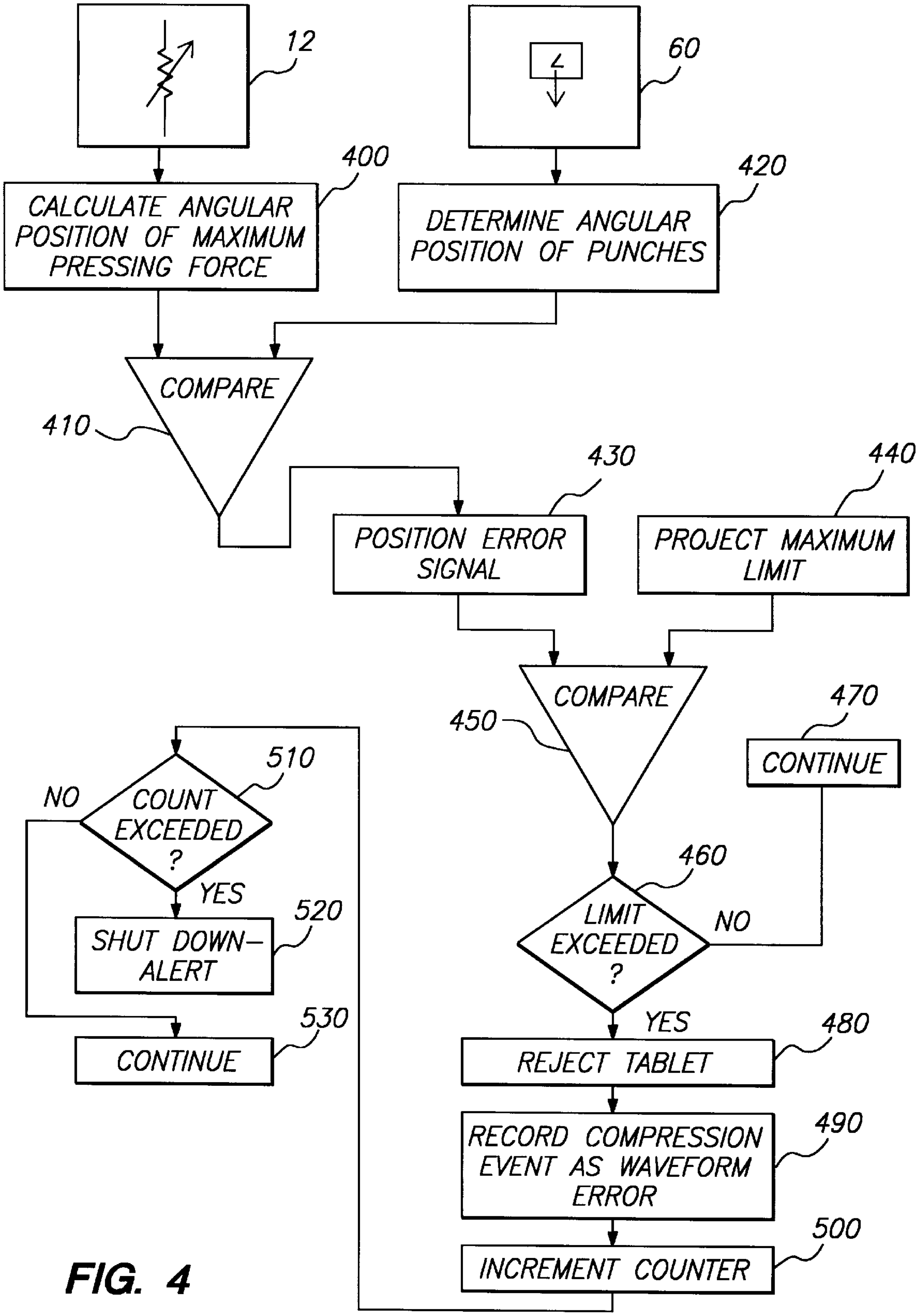
FIG. 4 is a partial flow diagram showing operation of the system for monitoring and controlling compression forces in a rotary tablet compressing machine according to another embodiment of the invention.

FIG. 4 is a partial flow diagram showing operation of the system for monitoring and controlling compression forces in a rotary tablet compressing machine according to another embodiment of the invention. Such embodiment validates the compression waveform by comparing (410) the calculated angular position of the maximum pressing force (400), for example as determined by a strain gauge 12 (discussed above), to the angular position of the punches (420), as determined by a separate signal that is derived from a transducer 60 which is responsive to the angular position of the rotating turret. Such comparison produces a position error signal (430) that is then compared (450) to a preset maximum limit (440) which allows for normal mechanical tolerances. If this limit is exceeded (460), the tablet associated with the excess error is subsequently rejected (480) by a mechanism that is activated by the system. The system records the event (490) as a waveform error, and processes the error in an identical manner as that for the low coefficient of determination limit described above. Otherwise, system operation continues uninterrupted (470).

A counter 25 (see FIG. 1), having a user selectable maximum threshold, is incremented (500) each time a tablet is consecutively rejected from the same punch pair as a result of a waveform error. If the maximum count threshold is reached (510), then the tablet press is stopped (520) by the computer 26 and a message identifying the faulty punch pair is displayed on an operator interface 30. Otherwise, machine operation continues uninterrupted (530).

Figure 5:
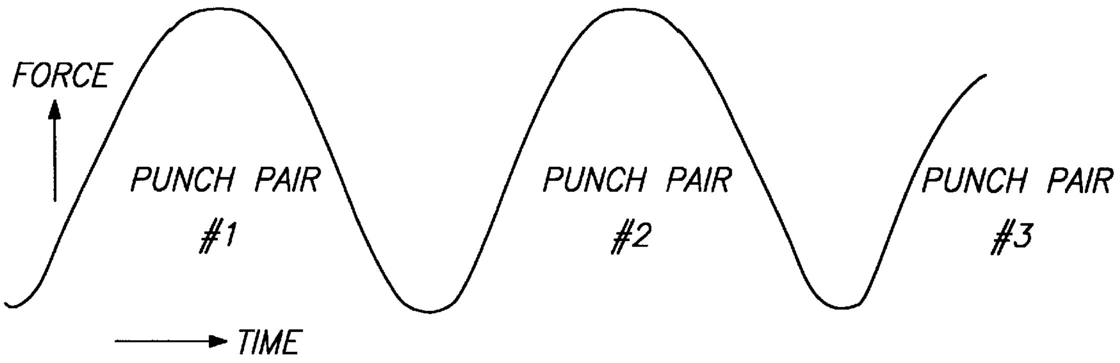
FIG. 5 is a graph plotting an ideal waveform showing force versus time for a series of compression events for a series of punch pairs in a tablet compressing machine.

FIG. 5 is a graph plotting an ideal waveform showing force versus time for a series of compression events for a series of punch pairs in a tablet compressing machine, where each compression event is represented by a curve. In operation, the technique herein disclosed fits data obtained during an actual compression event to such ideal curve. If the data fit the curve with a predetermined level of accuracy, then the compression event is considered to be within an acceptable range and the operation of the tablet compressing machine continues uninterrupted.

The ability to detect and identify mechanical defects of the tablet press or punches depends upon analysis of the amplitude deviations of the waveform from the least squares fitted function, ie, the residuals, which are defined as:

$$R_i = f(x_i) - y_i \quad (9)$$

where f is the fitting function; and $y_i$ is an array of waveform data points (as discussed above).

The residual $R_i$ is therefore the difference between the calculated value derived from the fitted function and the measured value or amplitude of the corresponding point of the waveform, ie, the deviation or distortion from the normal or ideal shape. Software routines may analyze the magnitude and sign of the residuals in specific portions, eg, phase angles, of the waveform to identify various defects that include the following:

Upper Punch Striking the Die Upon Entry

Mechanical interference between the upper punch and die surface or wall produces a compression waveform having a sharp rise followed by a sharp decline on the leading edge of the remainder of the waveform which follows the normal pattern. This spike is a result of the high force required for upper punch die entry. Software can detect this defect by comparing the sum of the residuals (or a single residual) within a selected portion of the leading edge of the waveform with an adjustable threshold. If the threshold is exceeded, the tablet press is stopped and an appropriate message is displayed on the operator display 30.

Figure 6:
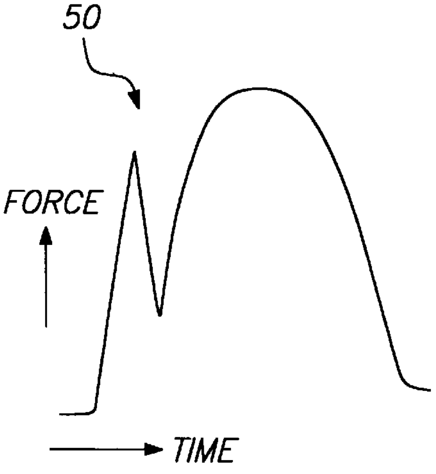
FIG. 6 is a graph plotting a distorted waveform for a compression event in which an upper punch strikes the die upon entry.
Figure 7:
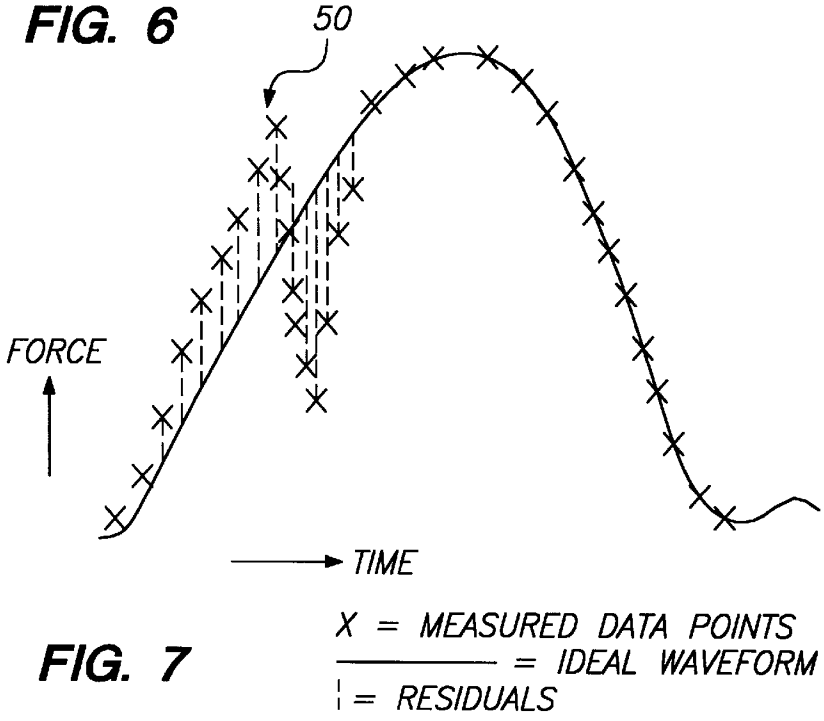
FIG. 7 is a graph showing the fitting of the distorted waveform of FIG. 6 to the ideal waveform of FIG. 5.

FIG. 6 is a graph plotting a distorted waveform for a compression event in which an upper punch strikes the die upon entry. It can be seen that the punch strike produces a signature spike 50 in the data curve. FIG. 7 is a graph showing the fitting of the distorted waveform of FIG. 6 to the ideal waveform of FIG. 5. In the figure, the data obtained during a compression event are fitted to the ideal curve and the manufacturing defect, in this case the upper punch striking the die upon entry, ie, the spike 50, is readily identified. The device and method of the present invention identifies such defects and, in addition to either rejecting the tablet or stopping operation of the tablet compressing machine, indicates the precise nature of the machine defect to a machine operator, such that proper service and maintenance may be implemented without the need for time consuming trouble shooting. Such defects can be logged, such that an electronic record of machine events is automatically created.

Pressure Overload in Tablet Presses Equipped with an Overload Release Mechanism Tablet presses equipped with an overload release mechanism provide an upper limit on the compression force that can be applied by allowing the compression rollers to move apart if the overload limit is exceeded. When this occurs, the peak compression force no longer correlates to the tablet weight and, consequently, weight control that is based upon force measurement is corrupted.

Overload release tends to flatten the peak of the compression waveform. Software can detect this flattening effect by comparing the sum of the residuals, or a function thereof, within a selection portion of the peak of the waveform with an adjustable threshold. If the threshold is exceeded, the tablet press is stopped and an appropriate message is displayed on the operator display. It should be noted that the sign of the threshold should correspond to waveform samples that are lower in amplitude than the calculated (fitted) amplitude.

Figure 8:
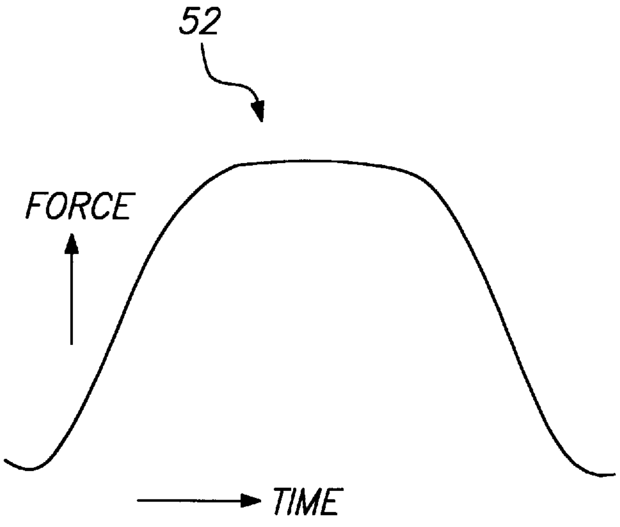
FIG. 8 is a graph plotting a distorted waveform for a tablet press in overload.
Figure 9:
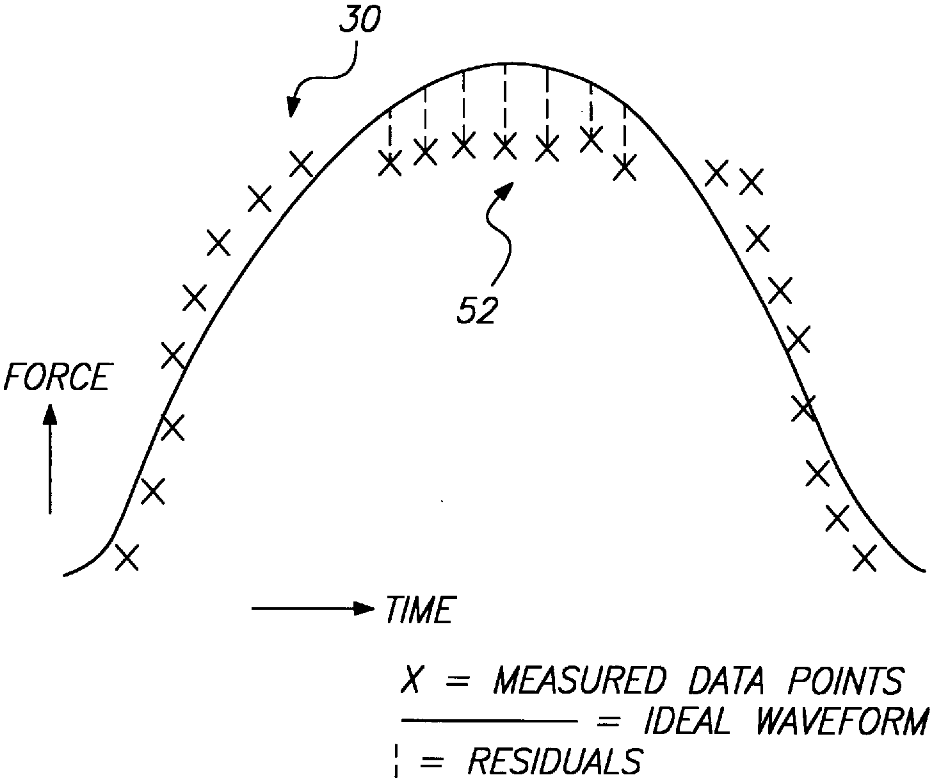
FIG. 9 is a graph showing the fitting of the distorted waveform of FIG. 8 to the ideal waveform of FIG. 5.

FIG. 8 is a graph plotting a distorted waveform for a tablet press in overload. It can be seen that a tablet press overload produces a signature flattening of the curve 52 in the data curve. FIG. 9 is a graph showing the fitting of the distorted waveform of FIG. 8 to the ideal waveform of FIG. 5. In the figure, the data obtained during a compression event are fitted to the ideal curve and the manufacturing defect, in this case a tablet press overload, ie, the flattening of the curve 52, is readily identified.

Those skilled in the tablet compressing arts will appreciate that the device and method of the present invention may be used to identify other defects which result in an abnormal compression waveform shape, including, but not limited to, punch head and compression roll defects, such as embedded metal particles or a partially broken or deformed punch and/or die surface, partially broken punches or dies, compression roll defects, roll bearing defects, defective pressure roll bearings, mechanical interference between the punch and die, or between the punch and the punch guide, sticking punches (which require a high initial force as they are displaced by the compression rollers and, therefore, produce a waveform that is similar to that which is representative of punch to die interference, however, the spike on the waveform for a sticking punch occurs in advance of punch tip to die contact), electrical interference caused by other machinery or by radio telecommunication signals (eg, cellular phones), and displacement of the angular position of the peak (ie, maximum amplitude) of the compression waveform.

The apparatus and method of the present invention is particularly useful for monitoring and controlling compression events in so-called low compression tabletting operations, in particular the compression of multilayer tablets (eg, tablets comprised of two or more separate and distinct layers). Multilayer pharmaceutical tablets and multilayer tablet presses used to make such tablets are well known to those skilled in the tablet making art. See for example Remington's Pharmaceutical Sciences, 18th Ed. (1990), Mack Publishing Company, page 1652. Commercial multilayer rotary tablet machines are generally capable of producing tablets having 1, 2 or 3 layers. Stratified tablets offer a number of advantages. Incompatible drugs can be formed into a single tablet by separating the layers containing them with a layer of inert material. Multilayer tabletting has also permitted the formulation of time-delay and timed-release medication. One particularly useful multilayer tablet configuration uses a bilayer core comprised of a drug-containing layer and a hydrophilic push layer. The core is then coated with a semipermeable membrane which is permeable to water but impermeable to the drug. An exit orifice is then drilled through the membrane in the side of the tablet which is adjacent to the drug-containing layer. Such dosage forms are disclosed for example in Wong et al. U.S. Pat. No. 4,783,337 and can be used to deliver both water soluble and water insoluble drugs over extended periods of time and at zero-order rates during passage of the dosage form through a patient's gastro-intestinal tract. In addition, multilayer tableting offers a wide variety of possibilities in developing color combinations which give the products identify. In the machines now available for multilayer production, the granulation receives a precompression (ie, tamping) stroke after the first and second fill, which lightly compacts the granulation and maintains a well-defined boundary between the two layers, followed by a final compression stroke at full compression forces. Other multiple-compression presses can receive previously compressed tablets and then compress another granulation around the preformed tablet, also referred to as press-coated tablets. Such press-coated tablets can be used to separate incompatible drug substances and also to give an enteric coating to the core tablet.

In general, a conventional tablet, formed with a single compression stroke, is typically manufactured at a compression force in the range of 18 to 27 kN (4000 to 6000 lbs). With these high compression forces, variations in the compressing force of less than 1 kN (200 lbs) usually results in negligible variation in the amount of drug contained in the tablet.

On the other hand, multilayer tablets are more typically produced at compression forces ranging from about 0.3 to 1 kN (75 to 200 lbs). In such low compression processes, a variation of for example 0.2 kN (50 lbs) produces unacceptable variation in the amount of drug contained within the various tablet layers. This is due to the fact that the relation between tablet weight and compression force is exponential. In other words, at low compression forces, a particular weight variation from tablet to tablet results in an exponentially lower compression force variation as compared to the same weight variation at higher compression forces. For example, assuming a tablet weight variation of 5 mg, the variation in the compression force ($\Delta F$) at a high compression force of 18 kN (4000 lbs) is about 2.5 kN (500 lbs), while at a low compression force of 1 kN (100 lbs) the $\Delta F$ is only about 0.02 kN (5 lbs). Such a low $\Delta F$ is very easily lost in any noise present in the data of conventional tablet press controllers. Thus, there is clearly a need for more precise control of compression forces in tablet presses making multilayer tablets. For this reason, the present invention has particular utility in the manufacture of multilayer tablets.

I claim:

1. A system for monitoring a compression event in a tablet compressing machine, comprising:

at least one data collection channel for sampling a plurality of points along a compression event waveform;

a processor for statistically fitting said sampled waveform to an equation representing an ideal compression event waveform; and apparatus for altering the operation of at least one of: (i) the tablet compressing machine; and (ii) a machine associated with the operation of said tablet compressing machine; based upon quality of the fit between the sampled waveform and the ideal waveform, wherein said apparatus performs an operation selected from the group consisting of: (i) rejecting a tablet formed in said tablet compressing machine if said fit quality falls below a preset value; (ii) signaling that a particular punch or die in said machine is malfunctioning; (iii) using said sampled waveform, via a feedback controller, to adjust the amount of solid material fed into a die for a subsequent compression if said fit quality falls above a preset value and ignoring said sampled waveform if said fit quality fall below said preset value; and (iv) combinations thereof.

2. The system of claim 1, further comprising a counter, having a user selectable maximum count threshold, wherein said counter is incremented when a tablet is rejected as a result of said fit quality falling below said preset value.

3. The system of claim 2, wherein operation of said tablet compressing machine is stopped if said maximum count threshold is reached within a predetermined interval.

4. The system of claim 1, further comprising a metering ramp adjuster, controlled by said processor, for adjusting a tablet press metering ramp.

5. The system of claim 1, further comprising a tablet reject device, controlled by the processor, adapted to separate tablets formed from compression event waveforms having a fit quality below a preset value from tablets formed from compression event waveforms having a fit quality above a preset value.

6. The system of claim 1, further comprising at least one of:

(a) a first sensor that is adapted to provide a signal to said processor at each punch barrel passage; and (b) a transducer, responsive to an angular position of a rotating turret on said compressing machine, to provide a signal to said processor.

7. The system of claim 1, further comprising a second sensor that is adapted to provide a signal to said processor at each revolution of a tablet press turret.

8. The system of claim 1, further comprising a computer, coupled to said processor, for providing an input/output interface that allows operator command entry and display of system status information.

9. The system of claim 1, further comprising at least one of: (a) means for providing at least one user selectable offset and/or sample length, prior to fitting said sampled waveform to said ideal waveform, such that waveform distortion at predetermined portions of said compression event does not result in a poor fit to said equation; and (b) processor reprogramer for applying a different statistical fitting function having a lower preset value for said fit quality.

10. The system of claim 1, said data collection channel further comprising a strain gauge, coupled to a Wheatstone bridge circuit, to convert compression forces F, applied to punches in said tablet compressing machine, into proportional voltage signals V;

an amplifier, coupled to receive said voltage signals V, said amplifier increasing said signals to a level that is suitable for digitizing; and an anti-aliasing filter for filtering said amplified signals.

11. The system of claim 10, further comprising a plurality of data collection channels and a multiplexer circuit that is capable of selecting more than one data collection channel.

12. The system of claim 1, wherein five points are sampled along said compression event waveform.

13. The system of claim 1, wherein fifty points are sampled along said compression event waveform.

14. A method for monitoring compression forces in a tablet compressing machine, comprising the steps of:

sampling a plurality of points along a compression event waveform;

statistically fitting said sampled waveform to an ideal compression event waveform; and altering the operation of at least one of: (i) the tablet compressing machine; and (ii) a machine associated with the operation of the tablet compressing machine; based upon quality of the fit between the sampled waveform and the ideal waveform, wherein the altering of performing an operation selected from the group consisting of: (i) rejecting a tablet formed in said tablet compressing machine if said fit quality falls below a preset value; (ii) signaling that a particular punch or die in said machine is malfunctioning; (iii) using said sampled waveform, via a feedback controller, to adjust the amount of solid material fed into a die for a subsequent compression if said fit quality falls above a preset value and ignoring said sampled waveform if said fit quality fall below said preset value; and (iv) combinations thereof.

15. The apparatus of claim 14, further comprising incrementing a counter, the counter have a user selectable maximum count threshold, wherein said counter is incremented when a tablet is rejected as a result of said fit quality falling below said preset value.

16. The method of claim 15, including stopping said tablet compressing machine if said maximum count threshold is reached within a predetermined interval of time or successive compressions.

17. The method of claim 14, wherein said sampling occurs a multiplicity of times over each compression event.

18. The method of claim 17, wherein the time between successive samplings is adjustable in proportion to a tablet compressing machine speed, such that the number of samplings of each compression event is substantially the same, at differing tablet compressing machine speeds.

19. The method of claim 14, including obtaining a beginning and an ending of said compression event by performing a step selected from the group consisting of:

(a) locating minimum compression force samples; and (b) using a signal derived from an angular position of a rotating turret on said compressing machine.

20. The method of claim 14, further comprising the step of validating a compression waveform by comparing a calculated position of a maximum compression force with a position of a tablet compressing machine punch.

21. The method of claim 20, further comprising the steps of;

producing a position error signal;

comparing said position error signal to a preset maximum limit; and subsequently rejecting a tablet if said limit is exceeded.

22. The method of claim 14, wherein said fitting step calculates residuals that indicate waveform distortions during a compression event, where such distortions are caused by a defect selected from the group consisting of an upper punch striking a die upon entry, a pressure overload in tablet presses equipped with an overload release mechanism, an imperfection in a punch head, an imperfection in a compression rolls, an imperfection in a roll bearing, electrical noise, electrical interference, mechanical interference between a punch and a die, mechanical interference between a punch and a punch guide, and a sticking punch.

23. The method of claim 13, wherein five points are sampled along said compression event waveform.

24. The method of claim 13, wherein five points are sampled along said compression event waveform.

* * * * *

UNITED STATES PATENT AND TRADEMARK OFFICE

CERTIFICATE OF CORRECTION

PATENT NO. : 5,838,571
DATED : Nov. 17, 1998
INVENTOR(S) : David A. Lewis

It is certified that error appears in the above-identified patent and that said Letters Patent is hereby corrected as shown below:

In claim 14, column 14, line 54, should read, "--operation comprises--" before the word "performing".

Signed and Sealed this

Thirtieth Day of March, 1999

Attest:

Q. TODD DICKINSON

Attesting Officer

Acting Commissioner of Patents and Trademarks